United States Patent Office 3,319,694
Patented May 16, 1967

3,319,694
CASCADE EVAPORATOR AND MEANS OF IMPROVING PERFORMANCE
Jay H. Freiday, West Hartford, Conn., assignor to Combustion Engineering Inc., Windsor, Conn.
Filed Dec. 6, 1965, Ser. No. 511,901
1 Claim. (Cl. 159—10)

This invention is directed to an evaporator for recovering soda ash and other chemicals from black liquor, and in particular to one that has a high efficiency in such recovery process.

In chemical recovery units, the residue from the treatment of wood pulp, which is called black liquor, contains a large amount of valuable chemicals which it is desired to reclaim for reuse. Because the liquor contains a large amount of organic combustibles, one economical method of recovering the chemicals is to burn the black liquor in a furnace, and recover the chemicals from the bottom of the furnace in the form of smelt. Before such liquor can be successfully burned in a furnace, however, the solids concentration of the liquor must be increased. This is accomplished in many installations by use of an evaporator of some sort. The hot combustion gases leaving the furnace are passed through the evaporator, causing evaporation of some of the moisture contained in the liquor, thus increasing the solids content thereof. Since a great amount of ash is carried over from the furnace along with the combustion gases, it is advantageous to utilize an evaporator which is designed so as to successfully separate some of the ash particles from the combustion gases.

It is an object of this invention to provide an evaporator which is highly efficient in the two-fold function of both evaporating moisture from black liquor, and separating ash particles from the combustion gases passing therethrough.

Figure 1:
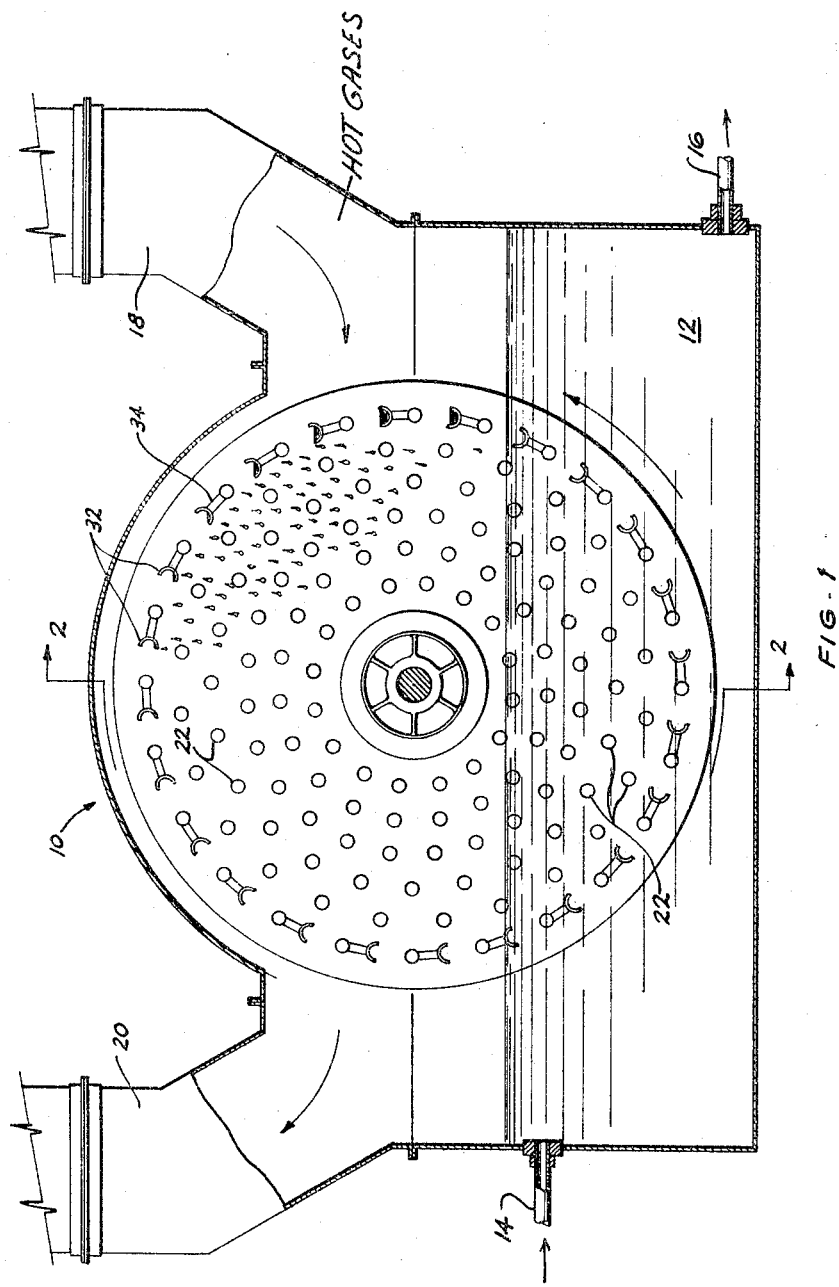
Figure 2:
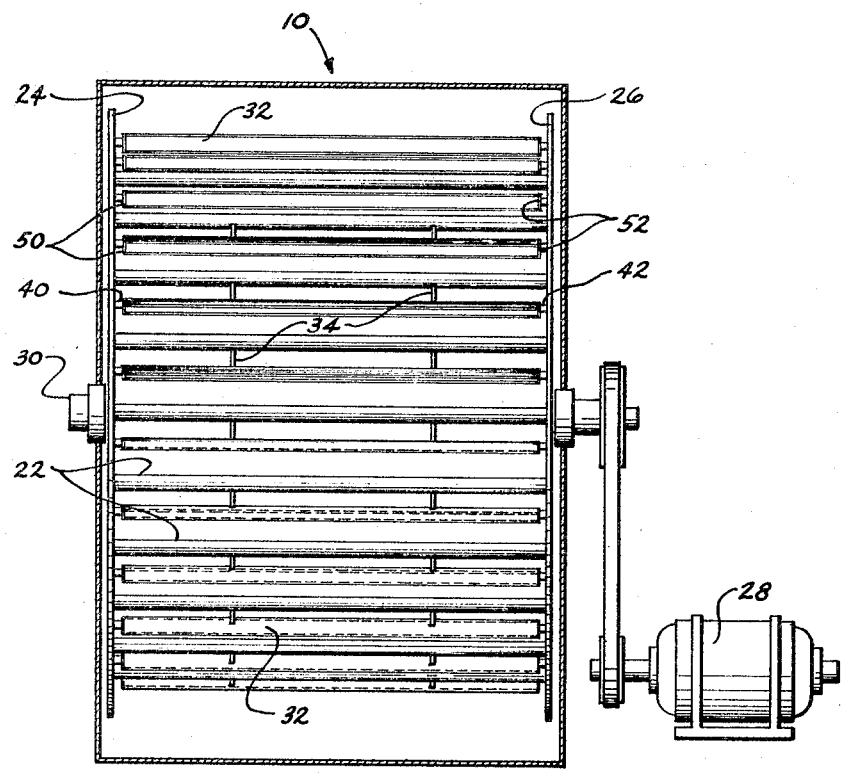

In the accompanying drawings:

FIGURE 1 is a sectional elevation of a cascade evaporator incorporating my invention; and FIGURE 2 is an end elevation taken on line 2—2 of FIGURE 1.

Looking now to the drawings, 10 designates a cascade evaporator. The lower portion of the evaporator housing contains a pool of black liquor. Raw liquor is fed into the evaporator through inlet pipe 14, and concentrated black liquor leaves the evaporator through outlet pipe 16, flowing to a chemical recovery furnace (not shown), where it is burned.

Hot combustion gases flowing from the furnace enter the upper portion of evaporator 10 through duct 18. After giving up a major portion of its heat in traversing the evaporator surface, the gases exit by way of duct 20.

The evaporating surface consists of a plurality of pipes or cylindrical rods 22 secured between two outer discs 24 and 26. These discs and rods are continuously rotated about central shaft 30 by means of motor 28. Thus the rods 22 alternately pass through the pool of liquor in the bottom portion of the housing, and through the gas pass in the upper portion of the housing. In passing through the pool, the rods receive a coating of black liquor on their outer surfaces, and moisture is evaporated from this black liquor film as the rods come into contact with the hot combustion gases in the upper portion of the housing.

The concentrated black liquor on the rods is washed off as they again dip down into the black liquor pool. As previously mentioned, the hot combustion gases contain a large amount of ash particles, which are carried over from the furnace. As the combustion gases follow the tortuous paths between the rows of rods, a large percentage (as much as 50%) of these ash particles comes into contact with the coated rods, and adhere thereto because of the sticky nature of the black liquor.

What has been described above is old, and has been in existence for many years. In some cascade evaporator installations, problems have been encountered. It may not be possible to get as much evaporating surface into a given physical space as desired. Also, depending on the density of the black liquor, the dried liquor carried on the rods is not always completely washed off as the rods pass through the pool of liquor. This happens when all of the moisture is removed from the black liquor on a given rod or rods.

In accordance with my invention, U-shaped buckets or scoops 32 are positioned in the outer circumferential row of rods. When these are rotated through the pool of black liquor, they are filled. The contents of the buckets are then gravity discharged as they rotate up into the gas pass, the buckets being completely emptied when they reach their highest point of rotation.

The buckets are welded, or fastened in any other suitable manner, to short tube ends 40 and 42. Brackets 34 extend from adjacent rods just below the buckets, to also help support the buckets. The two ends 50 and 52 of the buckets are closed, so that black liquor can be held therein during the upward rotational travel of the buckets.

The black liquor falling from the buckets forms sheets of liquor from which moisture is evaporated, thus acting to increase the evaporating capacity without any additional structural evaporating surface. Some of the falling liquor will also come into contact with and will adhere to the rods in the intermediate circumferential rows of rods, thus giving more assurance that these rods will contain at least some moisture during the complete cycle of rotation. This will help prevent deposits of dried black liquor from building up on the rod surfaces, which is undesirable.

A further advantage of the invention is that a greater percentage of the ash particles carried by the combustion gases can be separated out in the evaporator. Many of these particles will be entrained in the sheets of black liquor falling from the buckets, thus being eventually transferred to the pool of black liquor contained in the lower portion of the evaporator housing.

Having thus described my invention what I claim as new and desire to secure by Letters Patent is:

An evaporator for recovering chemicals from black liquor including a housing, said evaporator having a first lower portion which houses a pool of black liquor to be evaporated, and an upper portion forming a gas passage through which hot gases flow, inlet means in said upper portion through which hot gases enter the housing, outlet means diametrically opposite said inlet means in said upper portion through which the hot gases leave the housing, rotatable means positioned in the housing, said rotatable means including two spaced, parallel, vertical outer discs mounted on a horizontal axis, which axis is transverse of the gas passage, a plurality of first members extending transversely between the two discs, driving means for rotating said rotatable means such that the plurality of members pass alternately through the pool of black liquor and the gas passage, a plurality of trough-shaped second members extending transversely between the two discs, said first and second members being positioned in a series of radially spaced circumferential rows, said second members being only in the outermost circumferential row, and being entirely within the peripheral edges of the discs, said trough-shaped members being positioned such that when they are rotated through the pool, they are filled with black liquor, and as they rotate through the gas passage, black liquor is discharged therefrom, said black liquor passing down through the spaces between the plurality of first members, and also falling onto the surfaces of the first members.

References Cited by the Examiner

UNITED STATES PATENTS

| 108,793 | 11/1870 | Johnson et al. | 159—10 |
| 462,102 | 10/1891 | Schmid | 261—92 |
| 2,522,905 | 9/1950 | Smith | 159—10 |

NORMAN YUDKOFF, Primary Examiner.

J. SOFER, Assistant Examiner.